United States Patent [19]

Maltsis

[11] Patent Number: 5,497,914
[45] Date of Patent: Mar. 12, 1996

[54] CAR CARE SELF-SERVICE DEVICE

[76] Inventor: Panos Maltsis, Kanalgasse 15, 2502 Biel, Switzerland

[21] Appl. No.: 196,166

[22] PCT Filed: Jun. 17, 1993

[86] PCT No.: PCT/CH93/00156

§ 371 Date: Mar. 28, 1994

§ 102(e) Date: Mar. 28, 1994

[87] PCT Pub. No.: WO93/25416

PCT Pub. Date: Dec. 23, 1993

[30] Foreign Application Priority Data

Jun. 17, 1992 [CH] Switzerland ............................ 1902/92

[51] Int. Cl.$^6$ ................................................ B67D 5/52
[52] U.S. Cl. ............................. 222/135; 222/2; 222/144.5
[58] Field of Search ............................. 222/2, 132, 135, 222/136, 144.5, 630, 639, 649

[56] References Cited

U.S. PATENT DOCUMENTS

| | | | |
|---|---|---|---|
| 4,527,713 | 7/1985 | Ingram | 222/2 |
| 5,044,520 | 9/1991 | Moisan | 222/136 X |
| 5,074,438 | 12/1991 | Ingram | 222/132 |
| 5,279,448 | 1/1994 | Hanlin et al. | 222/144.5 X |

*Primary Examiner*—Gregory L. Huson
*Attorney, Agent, or Firm*—Bachman & LaPointe

[57] ABSTRACT

A car care self-service device capable of carrying out a plurality of different car care operations comprising a housing defining an internal space, the housing having a front wall having an aperture for displaying a plurality of spray devices; a plurality of supply tanks for storing different car care agents, each of the plurality of supply tanks being in fluid communication with a respective one of each of the plurality of spray devices; a conduit for communicating each tank with a respective spray device, the conduit includes a hose mounted on a reel within the housing for allowing the hose to be unwound from the reel by pulling on the spray device thereby allowing the spray device to be moved to a work site; and a control within the housing internal space for selectively controlling the feed of car care agents from the supply tanks to the spray devices.

1 Claim, 3 Drawing Sheets

CAR CARE SELF-SERVICE DEVICE

BACKGROUND OF THE INVENTION

The present invention relates to a self-service device which enables an individual to perform a number of cleaning and other care procedures on an automobile without the necessity of a service person.

SUMMARY OF THE INVENTION

In accordance with the present invention, the self-service device is characterized by the fact that each one of a number of spray guns for spraying care products by means of compressed air is made accessible from outside, each spray gun being associated with a compressed air reservoir, a supply tank for the respective care product, and a mixing device, to the latter of which the spray gun is connected.

BRIEF DESCRIPTION OF THE DRAWINGS

The drawings show a specific embodiment of a device in accordance with the invention wherein.

DETAILED DESCRIPTION

Figure 1:
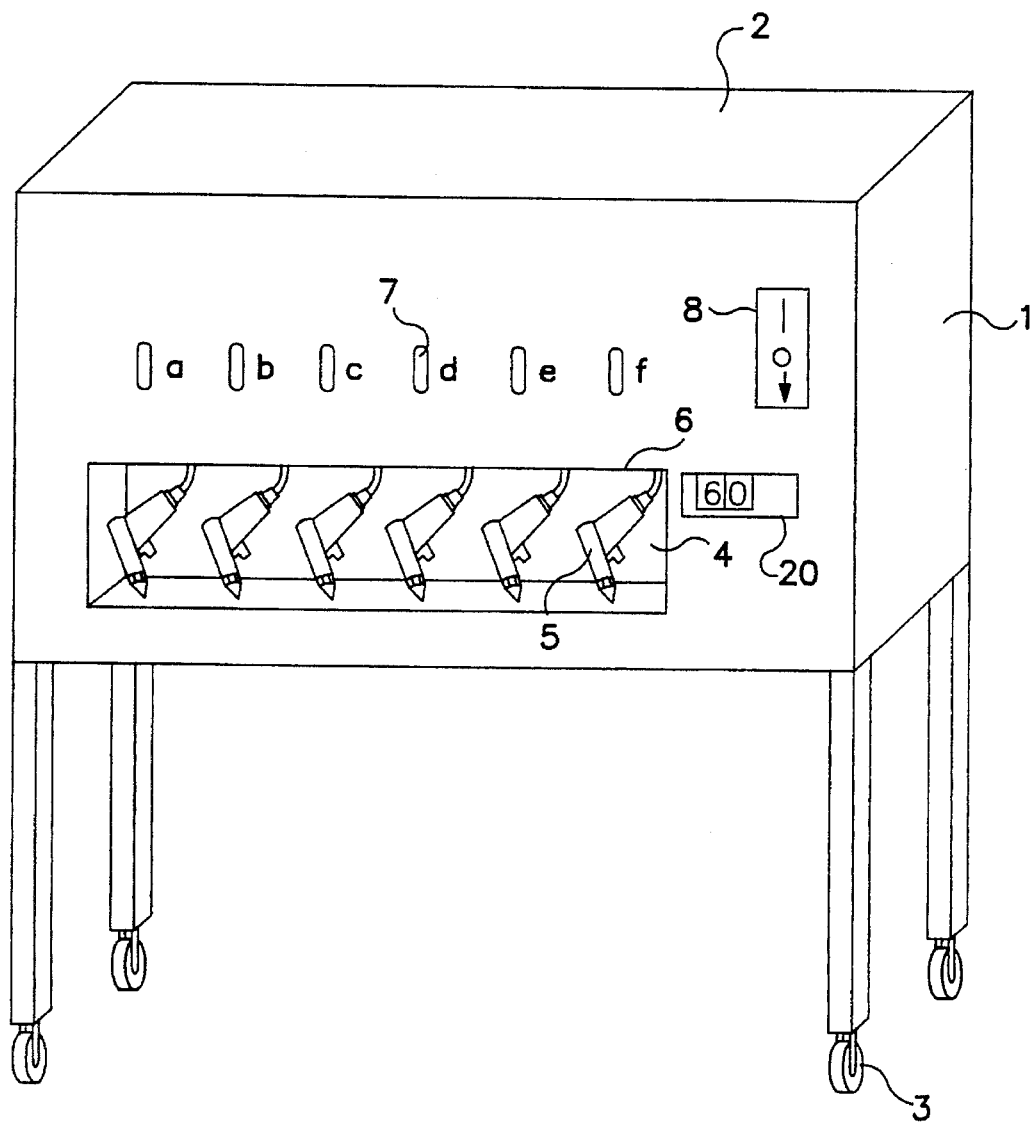
FIG. 1 is a schematic illustration of a device seen from the exterior.

The number 1 designates the housing of a self-service device, which has a hinged cover 2 and is mounted either movable on rollers 3 or, alternatively, maybe fixed to a wall. Six spray guns 5 with their connecting hoses 6 are suspended in a recess so that they may be easily taken down by the user and removed for use. Each gun 5 is specified for the application of a specific cleaning agent. The case functions may be selected as needed by means of the push-buttons 7a–f. In a modified version, this selection may be made at the same time as the operation of the devices are actuated by pushing on the button of the spray gun concerned. In the case of the example shown, the following functions are available for selection:

a) Tire-/rubber cleaner,
b) Windshield and glass cleaner,
c) Dashboard instrument cleaner,
d) Cushion and seat cleaner,
e) Engine sealing, and
f) Deodorizer-aerosol for the cabin air.

The number 8 designates an ordinary coin slot with coin-acceptor unit for activating the device, however, a slot for tokens also may be provided.

Figure 2:
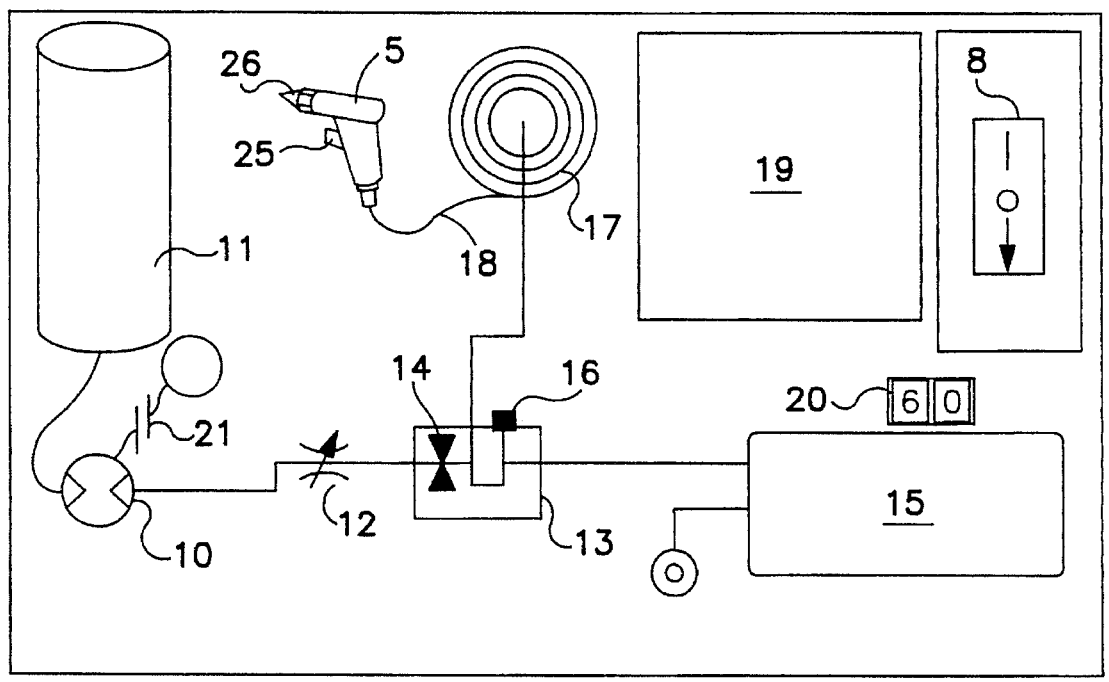
FIG. 2 schematically shows the arrangement of the parts associated with one spray gun.
Figure 3:
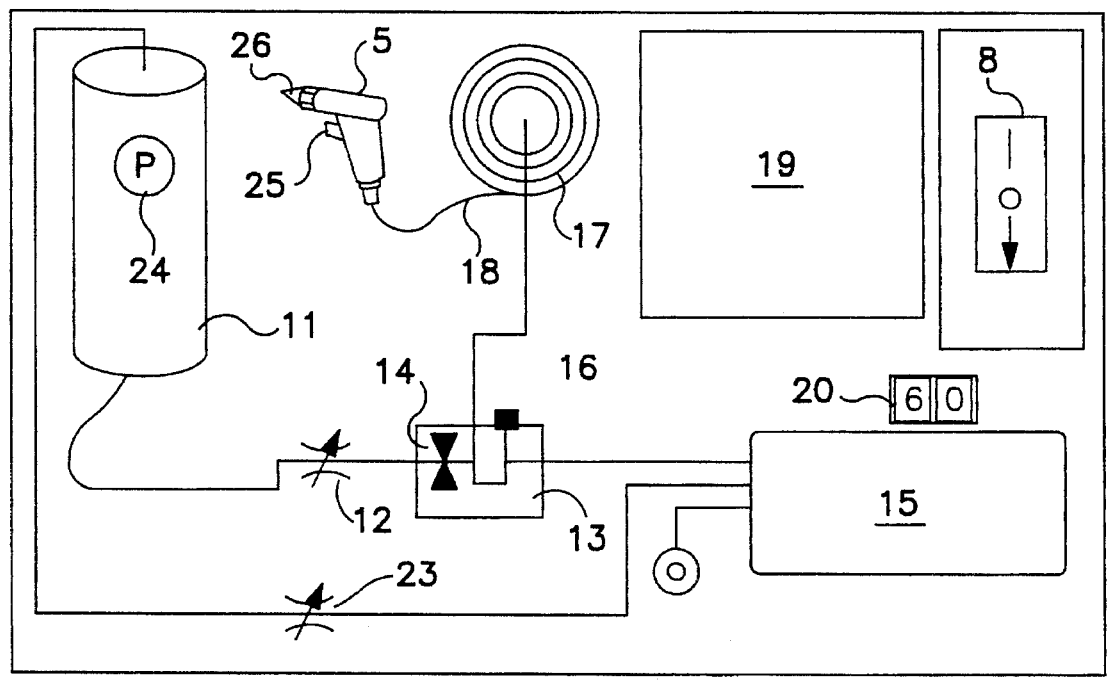
FIG. 3 shows an alternate version of FIG. 2.
Figure 4:
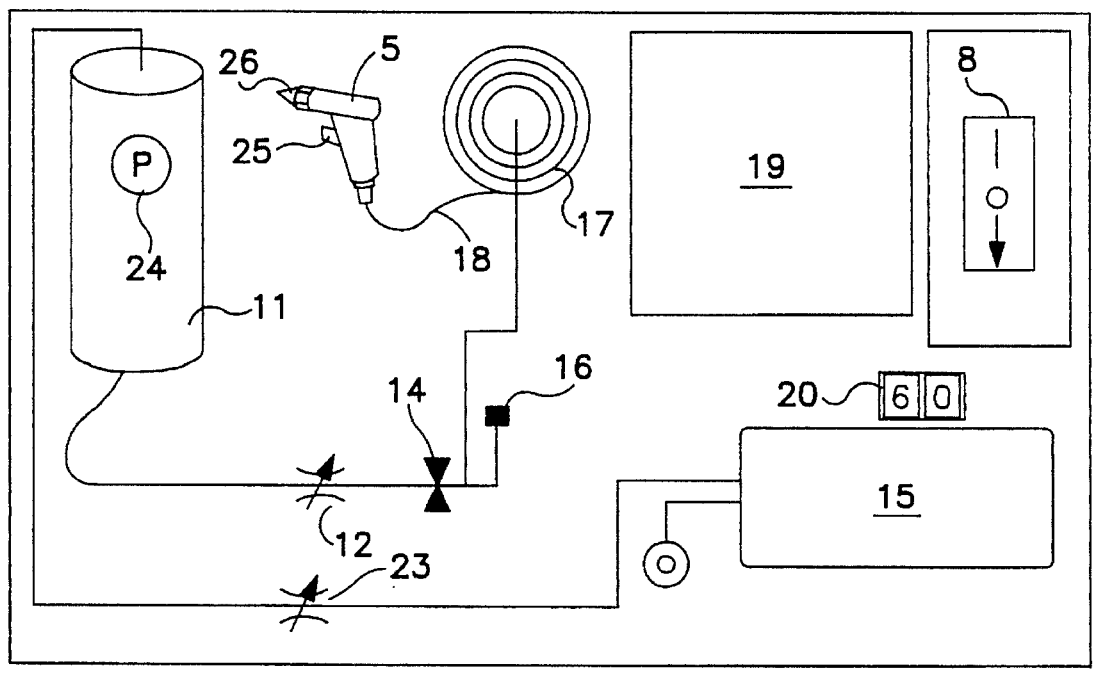
FIG. 4 shows a further embodiment of the present invention.

The elements included in the housing 1 are shown schematically in FIG. 2:

A feeding device in the form of a pump 10 supplies the cleaning agent associated with the respective spray gun 5 from the supply tank 11 via a throttle 12 in the mixing device 13, where it passes a release valve 14. Also, compressed air from the compresser air reservoir 15 is fed into the mixing device 13. From the mixing device 13 the compressed air mixed with the cleaning agent is supplied through the hose reel 17 to the spray gun 5. In the known way the hose 18 may be unwound from the reel 17 by pulling on the spray gun 5, so that the spray gun 5 may be conveniently guided to the work site.

A control box 19 having current supply, a blocking device connected with the coin slot, and the necessary control elements for all spray is located within the housing.

Upon the insertion of a token or of a corresponding amount of money, a fee for different care services may be charged, the blocking device is released by the control elements in control box 19 and the motor 22 and the selected mixing device are set into operation. In this case a pressure sensor 16 recognizes the consumption of the care agent and starts a timer or other amount limitation of the care agent in the control box 19. The time or amount made available for a cleaning procedure is indicated backwards (with decreasing value) in seconds or amount units by means of a graphic display 20.

The control may be set so that either a token or a coin may be inserted for each cleaning procedure or a total amount may be inserted for all cleaning procedures chosen.

Each supply feeding device or pump 10 may be driven by a separate motor 22. However, it is advantageous to provide only a common motor 22 to which the selected supply pump 10 in each case may be connected via a coupling 21.

In a similar way, it is also possible to provide only a single pressure reservoir 15 to which the selected mixing device 13 may be selectively connected.

Figure 5:
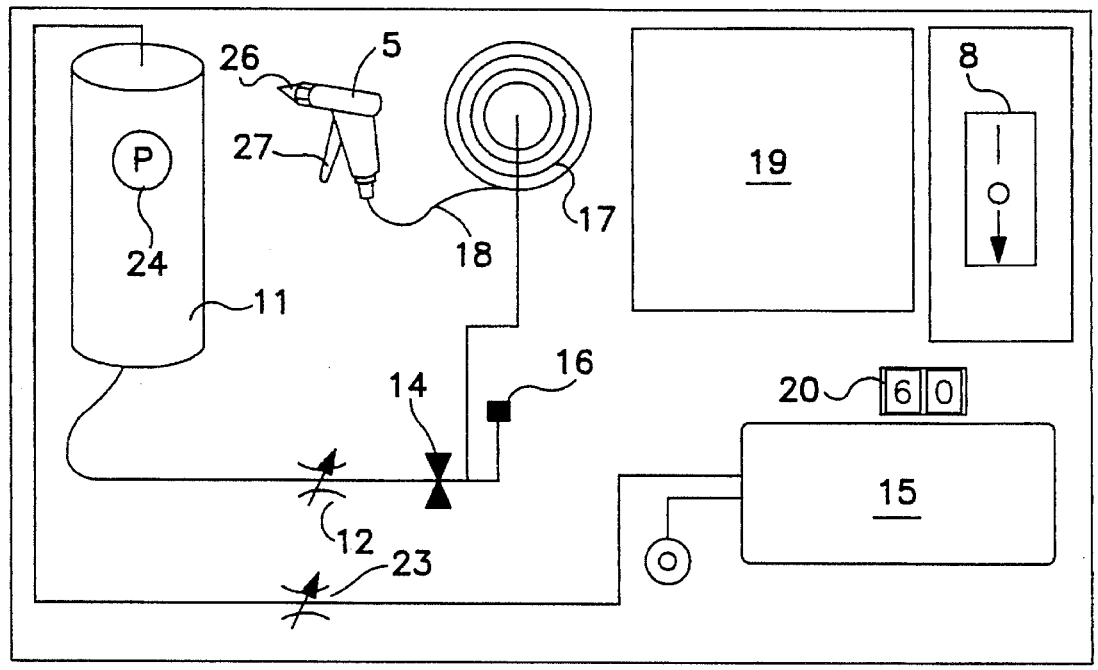
FIG. 5 shows a still further embodiment of the present invention.

In the case of the version shown in FIG. 5, the supply pressure of the different care agent tanks may be set so that the containers 11 are connected with the common pressure reservoir 15 via a pressure reducing valve 23 so that there is a supply of pressure 24 in each tank 11. However, each tank 11 may be connected via a separate pressure reducing valve 25 with the pressure reservoir 15, so that the supply pressure 24 may be set individually for each tank.

The pressure reservoir 15 may be refilled either by connecting to a compressor or to another pressure source.

A level indicator or a signal light, which lights up when a refill is required, may be provided in the front for each care agent tank. The device described may be installed in car washes, filling stations, or in large garages. The following care agents are to be considered here:

Rim cleaners
Engine cleaners
Windshield wiper fluid
Silicon for door gaskets
Distilled water
Rubber cleaner (tires)
Glass-/windshield cleaner
Plastic-/instrument cleaners
Upholstery/seat/leather cleaners
Engine sealing
Air freshener (deodorant/perfume)

Of course, the self-service device could be equipped with only one spray gun and with one care agent instead of several spray guns and care agents.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

I claim:

1. A car care self-service device capable of carrying out a plurality of different car care operations comprising a housing defining an internal space, said housing having a front wall having an aperture displaying a plurality of spray devices; a plurality of supply tanks for storing different car care agents, each of said plurality of supply tanks being in fluid communication with a respective one of each of said plurality of spray devices; conduit means for communicating each tank with a respective spray device, said conduit means includes hose means mounted on reel means within said housing for allowing said hose means to be unwound from said reel by pulling on said spray device thereby allowing said spray device to be moved to a work site; a feeding device associated with each conduit and a common motor within said housing internal space for selectively controlling the feed of car care agents from said supply tanks to said spray devices by said feeding device, said common motor having a coupling for selectively connecting said motor to said feeding device.

* * * * *